(12) United States Patent
Grimm et al.

(10) Patent No.: US 6,871,875 B2
(45) Date of Patent: Mar. 29, 2005

(54) SUPPORTING STRUCTURE OF A COMMERCIAL VEHICLE

(75) Inventors: Karl-Heinz Grimm, Reutlingen (DE); Georg Stefan Hagemann, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 54 days.

(21) Appl. No.: 10/384,149

(22) Filed: Mar. 7, 2003

(65) Prior Publication Data

US 2003/0178834 A1 Sep. 25, 2003

(30) Foreign Application Priority Data

Mar. 7, 2002 (DE) .......................................... 102 10 147

(51) Int. Cl.⁷ .............................................. B62D 21/12
(52) U.S. Cl. ...................... 280/785; 180/312; 296/204
(58) Field of Search ............................... 280/781, 785, 280/797, 799; 180/311, 312; 296/190.08, 203.01, 204

(56) References Cited

U.S. PATENT DOCUMENTS

| | | | | |
|---|---|---|---|---|
| 3,409,098 A | * | 11/1968 | Brueder | 180/54.1 |
| T966,007 I4 | * | 1/1978 | Liehr et al. | 296/28 R |
| 5,033,567 A | * | 7/1991 | Washburn et al. | 180/89.12 |
| 5,725,247 A | * | 3/1998 | Nilsson et al. | 280/781 |
| 6,047,989 A | * | 4/2000 | Wood | 280/789 |

FOREIGN PATENT DOCUMENTS

| | | | |
|---|---|---|---|
| DE | 43 22 717 | 1/1995 | |
| DE | 43 33 314 | 4/1995 | |
| DE | 195 22 341 | 1/1997 | |
| DE | 196 25 380 | 1/1997 | |
| DE | 19958921 A1 * | 6/2000 | B62D/47/00 |
| EP | 0 591 715 | 4/1994 | |
| GB | 1 512 712 | 6/1978 | |
| WO | WO 01/21468 | 3/2001 | |

* cited by examiner

Primary Examiner—David R. Dunn
(74) Attorney, Agent, or Firm—Kenyon & Kenyon

(57) ABSTRACT

A supporting structure of a commercial vehicle, e.g., a lorry, includes an axle support element, a front element and a longitudinal member element. The axle support element has, on each side of the vehicle, an axle-support side part which has a front attachment end, for the fastening of a longitudinal member of the front element, and a rear attachment end, for the fastening of a longitudinal member of the longitudinal member element. The attachment ends of the axle-support side part are configured in such a manner that the longitudinal members may be fixed on along the respective attachment end at a plurality of points which differ from one another with regard to the vertical level, based on an underlying surface on which the vehicle is standing.

14 Claims, 5 Drawing Sheets

SUPPORTING STRUCTURE OF A COMMERCIAL VEHICLE

CROSS-REFERENCE TO RELATED APPLICATIONS

The present application claims priority to Application No. 102 10 147.7, filed in the Federal Republic of Germany on Mar. 7, 2002, which is expressly incorporated herein in its entirety by reference thereto.

FIELD OF THE INVENTION

The present invention relates to a supporting structure of a commercial vehicle, e.g., a lorry. The present invention also relates to a modular system for the construction of a supporting structure of this type.

BACKGROUND INFORMATION

It is described in German Published Patent Application No. 43 33 314 to separate the frame longitudinal members in a frame of a commercial vehicle into separate longitudinal member parts for a cab-with-engine and for a vehicle body region. This makes it possible in each case to produce the longitudinal members in the cab-with-engine region and in the body-side region with a different cross-sectional profile, as a result of which better adaptation to the differing loading of the longitudinal members in the cab-with-engine region and in the body region is possible.

European Published Patent Application No. 0 591 715 describes a commercial vehicle having a chassis of modular construction. The modules used for the construction of the chassis can largely be pre-assembled and put together in the pre-assembled state. The first module includes essentially a chassis/frame front part with front axle(s), drive assembly and driver's cab. The second module includes essentially a chassis/frame central part with fuel tank and compressed-air containers and further add-on parts. The third module includes essentially a chassis/frame rear part with rear axle(s) and other add-on components. In addition to an increased compactness of assembly within the scope of a conveyor line assembly, the modular construction of the chassis also permits flexible adaptation with regard to the design of the three modules to different types of vehicle or intended use.

The module assigned to the vehicle front part has, on each side of the vehicle, a longitudinal member which, in side view, forks in a Y-shaped manner at the front, with an under-ride protector being fitted on the lower forking.

International Published Patent Application No. WO 01/21468 describes a further vehicle in a modular design. The individual module units which are joined to one another include a driver's cab module unit, a load-supporting module unit containing at least one axle, and a drive module unit which is arranged between the driver's cab module unit and the load-supporting module unit and contains a drive unit and an axle. The individual module units are fitted to one another via coupling devices which are fitted to or integrally formed on transverse members of the module units.

German Published Patent Application No. 195 22 341 describes a vehicle frame for a transportation vehicle, which has a front ladder-type frame and a rear ladder-type frame. The two ladder-type frames are connected rigidly to each other via a support arranged centrally with respect to them.

In the case of supporting structures of this type, the upper edges of the supporting structure form intersecting points, firstly to a driver's cab and secondly to a vehicle body. As a function of the conditions of use of the commercial vehicle, differing upper-edge heights for the vehicle body and/or for the driver's cab have to be realized for the supporting structure. For example, an entrance height has to be ergonomically optimized as a function of the required ground clearance.

It is an object of the present invention to provide, for a supporting structure, an arrangement which may be adapted, e.g., in a relatively simple manner, to different applications of the vehicle.

SUMMARY

The above and other beneficial objects of the present invention may be achieved by providing a supporting structure and a modular system as described herein.

The present invention is based on the arranging, on each side of the vehicle, a side part of an axle support element, which part is arranged between a front element arranged in front of it and a longitudinal member element arranged behind it, such that a plurality of attachment points or assembly positions for at least one longitudinal member of the front element and/or for at least one longitudinal member of the longitudinal member element are provided on the axle-support side part, the positions making it possible to select a vertical level for the respective longitudinal member with respect to an underlying surface on which the vehicle fitted with the supporting structure is standing, at which level the respective longitudinal member may be connected fixedly to the axle-support side part. This arrangement may make it possible, in particular, to realize different heights relative to the underlying surface for the upper edge of the longitudinal member element and/or for the upper edge of the front element, as a result of which the supporting structure according to the present invention may have particularly great variability in this regard. The front overhang of the vehicle, i.e., the distance between the vehicle front edge and front axle, may easily be varied, for example, for presenting a cab-over-engine vehicle or a front-lid-type vehicle. The adaptation of the supporting structure to different conditions of use of the vehicle fitted with it may thereby be realized in a relatively simple manner, with it being possible to use the same components, e.g., the axle support element, front element and longitudinal member element, for different types of vehicle. As a result, the formation of variants for the supporting structure or for the vehicle fitted with it may be comparatively inexpensive.

In an example embodiment, a front and/or a rear attachment end of the axle-support side part has a vertical grid for a screw connection, with the aid of which the longitudinal member or longitudinal members is or are screwed onto the respective attachment end. This grid is configured such that it may permit a plurality of screw-on positions for the longitudinal member or longitudinal members, these screw-on positions differing from one another with regard to the vertical level. With the aid of a screw-connection grid of this type, relatively high flexibility for the level of the longitudinal member to be screwed on in each case may be obtained. For example, a plurality of screw openings arranged in grid form are provided on the respective axle-support side part with the screw connection between the respective longitudinal member and the axle-support side part taking place through them. Not all of the screw openings may be required in an individual case. However, the spectrum, which may be required for forming variants, of different level positions or relative positions between the axle-support side part and longitudinal member is intended to be covered by the totality of all of the screw openings.

In another example embodiment, a front and/or-a rear attachment end of the axle-support side part may have a vertical end edge to which a vertical connecting strip of a flange part is fastened, this end edge and the connecting strip being dimensioned such that a plurality of fastening positions may be selected along the end edge for the connecting strip, which positions differ from one another with regard to the vertical level, with the longitudinal member or longitudinal members being fastened to the flange part. A flange part of this type serves virtually as an adapter between the respective longitudinal member and the axle-support side part. Thus, with the aid of a flange part of this type, a connection between the respective longitudinal member and the axle-support side part which may be optimized with regard to the required force and moment transmission may be achieved.

Moreover, it is possible, with the aid of a flange part of this type, to attach differently shaped longitudinal members to the axle-support side part, as a result of which the variability of the supporting structure may be increased.

According to an example embodiment, the two axle-support side parts may be connected to each other on a lower side, which faces the underlying surface, via a lower bridge-type support which has a front transverse member, a rear transverse member and a longitudinal member which is arranged centrally and connects the two transverse members to each other. While the front transverse member connects the front attachment ends of the axle-support side parts to each other, the rear attachment ends of the axle-support side parts are connected to each other via the rear transverse member. The lower bridge-type support formed in this manner has, in a view orientated perpendicularly with respect to the underlying surface, essentially an H shape and may serve as a multifunctional support. For example, a steering drop arm, a track arm and a lower A-frame arm of an independent wheel suspension may be mounted on it. Furthermore, an intermediate gearbox for an all-wheel drive may be fitted on this lower bridge-type support.

The two axle-support side parts may additionally be connected to each other on an upper side, which faces away from the underlying surface, in the region of their rear attachment ends via an upper bridge-type support in such a manner that, in the rear region of the axle support element, the rear attachment ends, the upper bridge-type support and the rear transverse member of the lower bridge-type support form a closed ring. This arrangement may enable supporting forces and moments to be supported particularly effectively, since the axle support has particularly high rigidity in the region of this closed ring. In particular, the axle support is of self-supporting configuration in this arrangement, so that it is possible, for example, to support spring and/or shock-absorber elements of the wheel suspension or axle suspension on the axle support element.

Furthermore, an internal combustion engine may also be mounted via corresponding engine bearings on the axle support element, as may an optionally provided gearbox.

Further features and aspects of the present invention are described with reference to the drawings.

The features which have been mentioned above and those which have yet to be explained below may be used not only in the respectively stated combination, but also in other combinations or on their own without departing from the scope of the present invention.

Exemplary embodiments of the present invention are illustrated in the drawings and will be explained in greater detail in the following description where the same reference numbers refer to identical or functionally identical or similar components.

DETAILED DESCRIPTION

Figure 1:
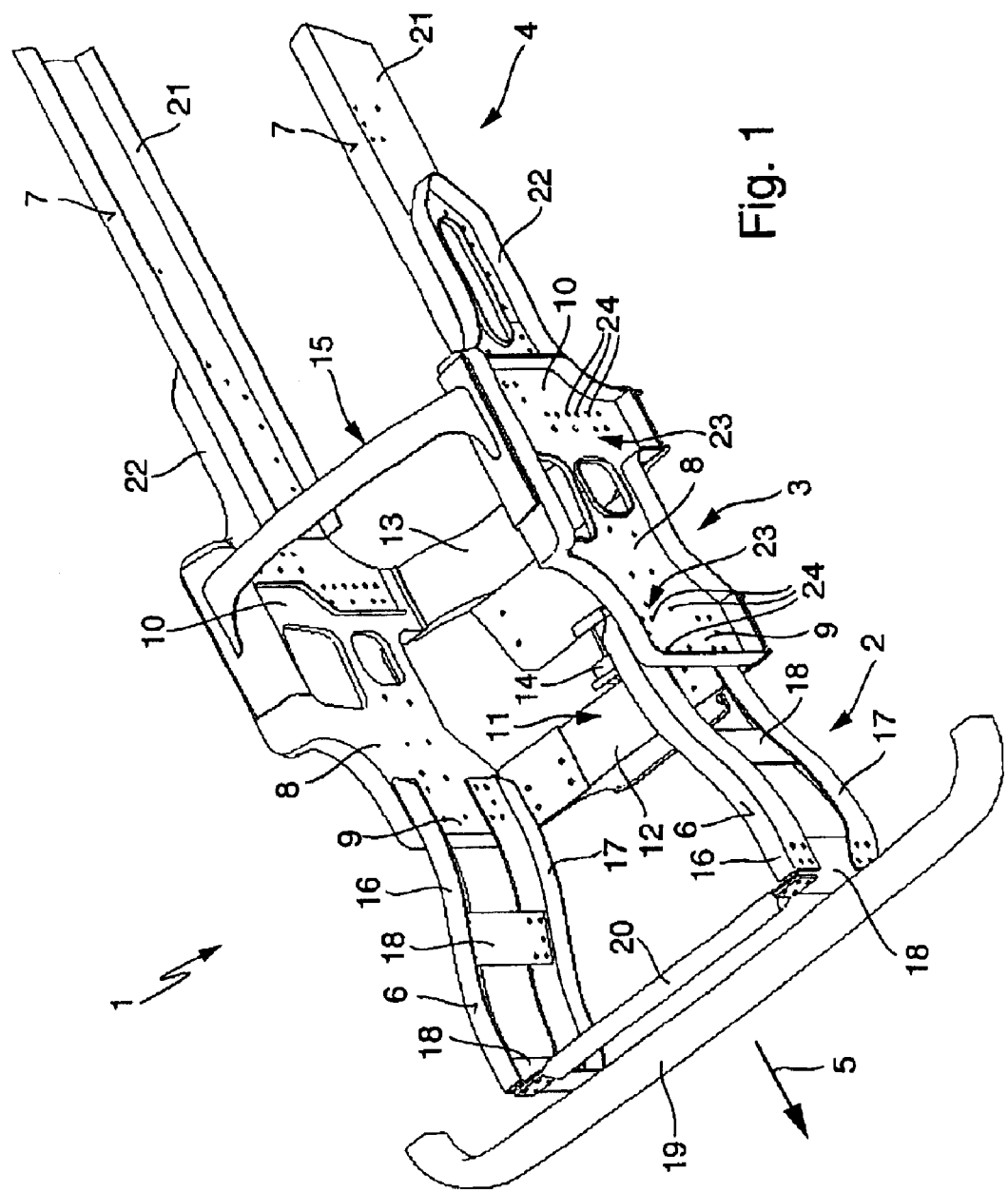
FIG. 1 is an isometric view of a supporting structure according to the present invention in a front section.

As illustrated in FIGS. 1 to 4, a supporting structure 1 according to the present invention of a commercial vehicle, e.g., a lorry, includes a front element 2, an axle support element and a longitudinal member element 4 (only part of which is illustrated). The front element 2 is attached to the front of the axle support element 3, with regard to a direction of travel 5 of the vehicle symbolized by an arrow, and serves, for example, on its upper side 6, for supporting a driver's cab. The axle support element 3 serves for the mounting of one or more front axles of the vehicle. The longitudinal member element 4 is attached to the rear of the axle support element 3, with respect to the direction of travel 5, and serves, for example on its upper side 7, for supporting a body of the vehicle.

The axle support element 3 has, on each side of the vehicle, an axle-support side part 8 which has, in each case with respect to the direction of travel 5, a front attachment end 9 and a rear attachment end 10. While the front element 2 is attached to the front attachment ends 9, the rear attachment ends 10 serve for the attachment of the longitudinal member element 4. In addition, the axle support element 3 has, on a lower side which faces an underlying surface on which the vehicle fitted with the supporting structure 1 is standing, a lower bridge-type support 11 which includes a front transverse member 12, a rear transverse member 13 and a central longitudinal member 14. The front transverse member 12 connects the two front attachment ends 9 of the two axle-support side parts 8 to each other. In a corresponding manner, the rear transverse member 13 connects the rear attachment ends 11 of the two axle-support side parts 8 to each other.

Figure 2:
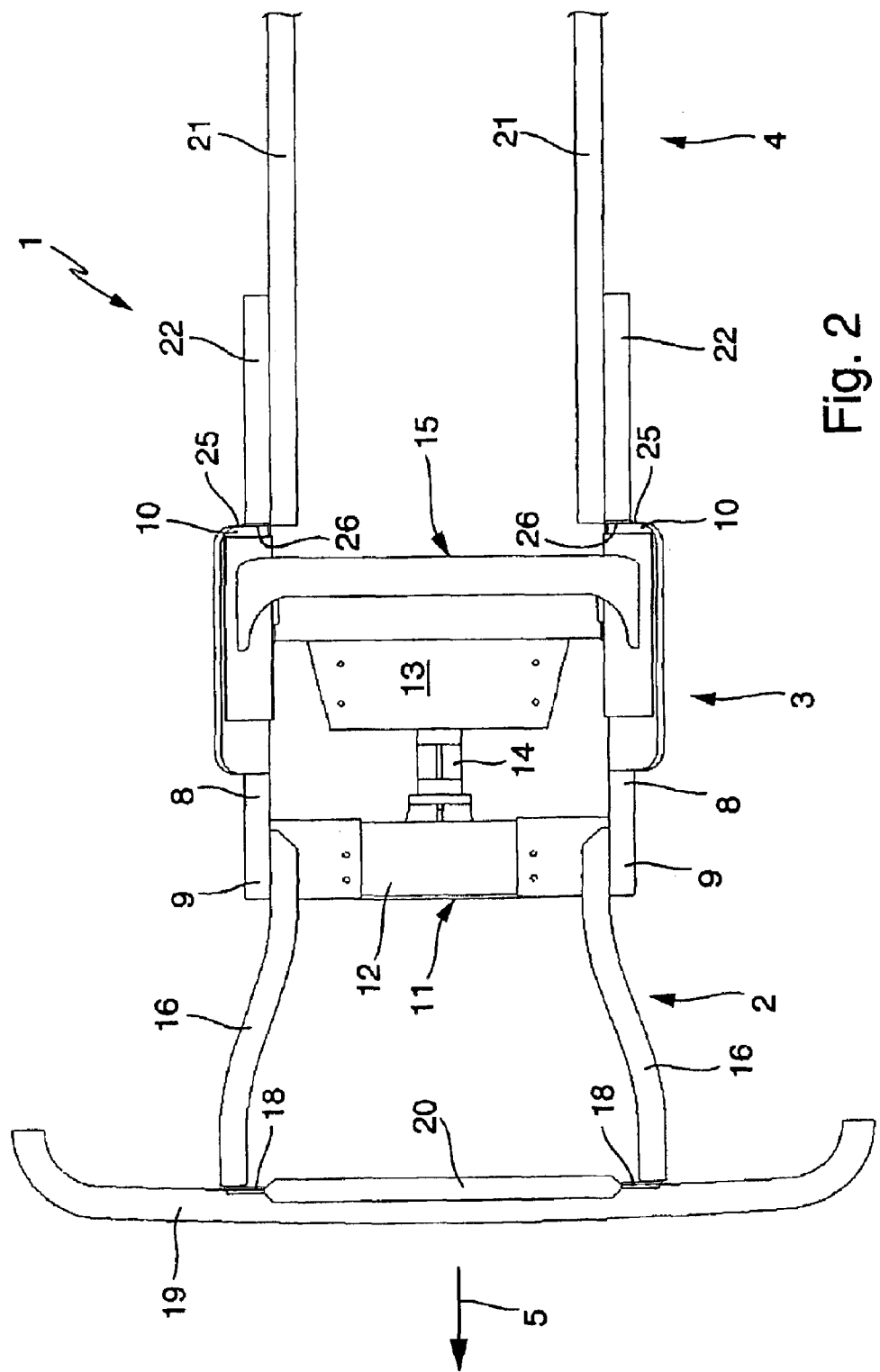
FIG. 2 is a plan view of the supporting structure illustrated in FIG. 1.
Figure 3:
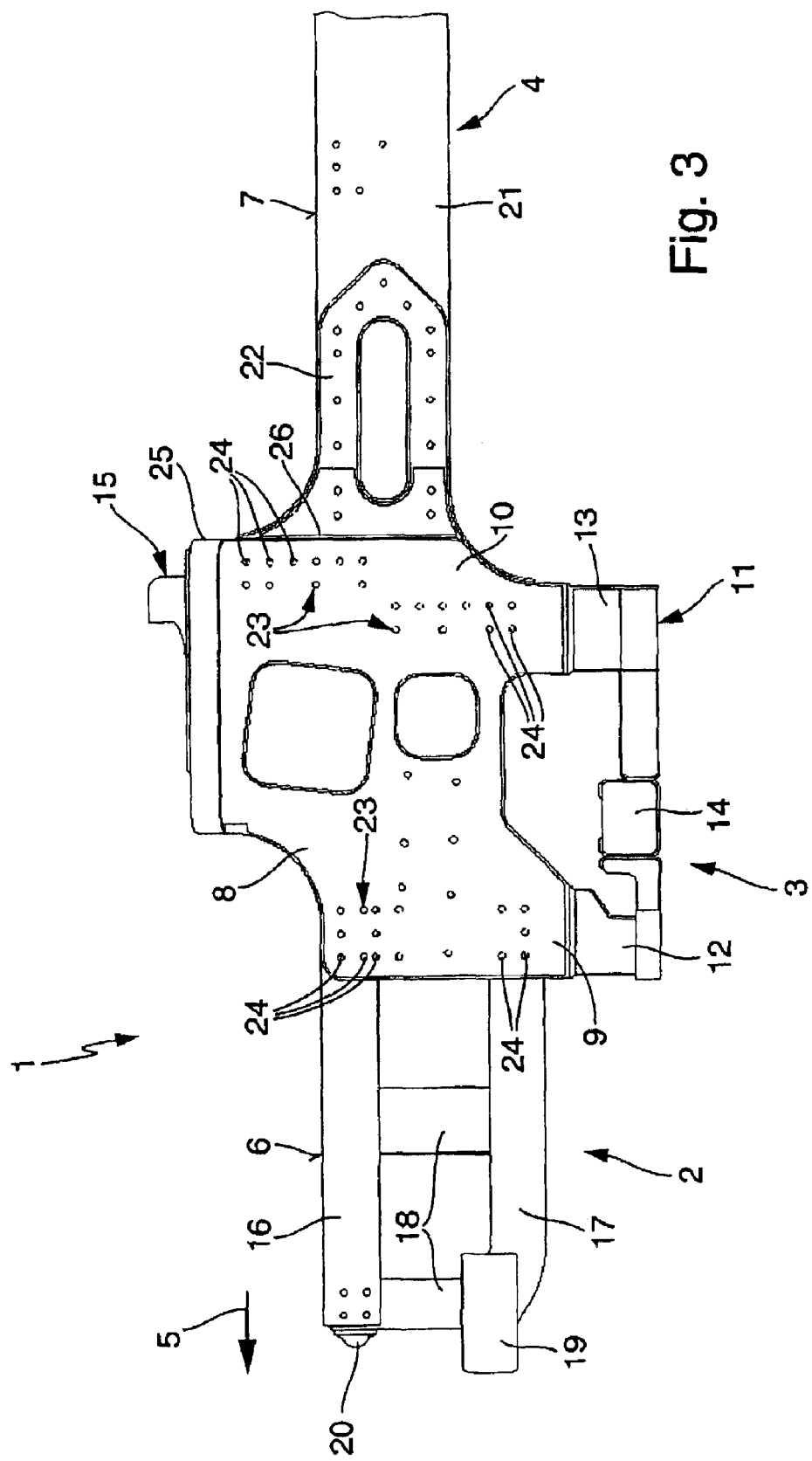
FIG. 3 is a side view of the supporting structure illustrated in FIG. 1.

The longitudinal member 14 is arranged approximately centrally between the two axle-support side parts 8 and connects the two transverse members 12 and 13 to each other. While the two transverse members 12, 13 extend essentially transversely with respect to the direction of travel 5, the longitudinal member 14 extends approximately parallel thereto. Thus, the overall result for the lower bridge-type support 11 in the plan view illustrated in FIG. 2 is essentially an H shape.

In addition, the axle support element 3 has, on an upper side which faces away from the underlying surface, an upper bridge-type support 15 which connects the two axle-support side parts 8 to each other in the region of the rear attachment ends 10. This arrangement may enable the rear attachment ends 10, the upper bridge-type support 15 and the rear transverse member 13 of the lower bridge-type support 11 to be arranged and connected to one another in such a manner that they form a closed ring in the rear region of the axle support element 3, this being illustrated in FIG. 4. By this arrangement, the axle support element 3 may have particularly high torsional rigidity and may be suitable, e.g., for the transmission of the axial forces between the supporting structure 1 and underlying surface or carriageway.

Figure 4:
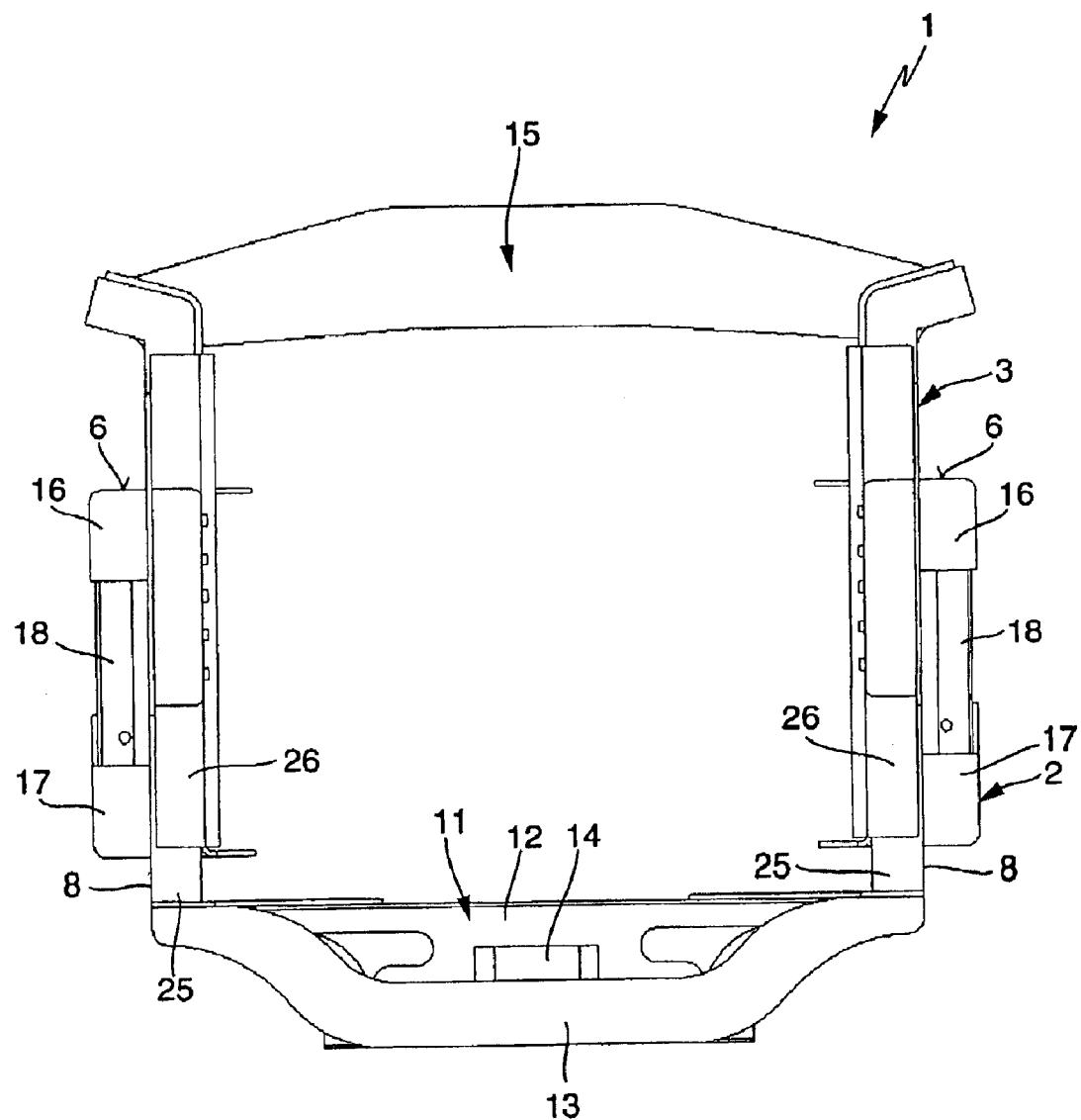
FIG. 4 is a view from behind of the supporting structure illustrated in FIG. 1 in a simplified illustration.

In the case of the example embodiment illustrated, the front element 2 has, on each side of the vehicle, two longitudinal members 16 and 17 which are spaced apart from each other in the vertical direction and may therefore also be described as an upper flange 16 and lower flange 17. The longitudinal member 16, 17 of the front element 2 are connected to each other via vertical webs 18. Each of the longitudinal members 16, 17 of the front element 2 is in each case independently fastened at their rear ends, with respect to the direction of travel 5, to one of the front attachment ends 9 of the axle-support side parts 8. An under-ride protector 19 and a transverse member 20, for example in the form of a tubular transverse member, are provided in the region of the front ends of the longitudinal members 16, 17 or the front element 2. The transverse member 20 adjoins the front of the upper longitudinal members 16, in the direction of travel 5, while the under-ride protector 19 adjoins the front of the lower longitudinal members 17, in the direction of travel 5. Both the under-ride protector 19 and transverse member 20 are fastened here, on each side of the vehicle, in each case to the front, vertical web 18. The function of the under-ride protector 19 is explained in greater detail, for example, in European Published Patent Application No. 0 591 715, which has been mentioned above. The transverse member 20 serves essentially for stiffening the front element 2. As illustrated in FIG. 4, the under-ride protector 19 and the transverse member 20 have been omitted in order to simplify the illustration.

The axle support element 13 and the front element 2 may be configured in such a manner that they form a unit which may be pre-assembled independently of the longitudinal member unit 4. The longitudinal member unit 4 may also be pre-assembled independently of the unit including the axle support element 3 and front element 2. Within the scope of an assembly process, the pre-assembled components may be completed to form the supporting frame 1.

In the case of the example embodiment illustrated, the longitudinal member unit 4 has, on each side of the vehicle, a single-part profiled longitudinal member 21. The profile longitudinal members may be connected to each other, for example, by transverse members, in order to form a ladder-type frame. In the case of the example embodiment illustrated, the profiled longitudinal members 21 of the longitudinal member element 4 are not connected directly to the axle support element 3. Rather, each profiled longitudinal member 21 is connected to a flange part 22 which, for its part, is fastened to the respective, rear attachment end 10 of the associated axle-support side part 8. In this case, the flange part 22 may take on the function of an adapter which makes it possible to connect profiled longitudinal members 21 of various designs or longitudinal member elements 4 of differing configuration to the axle support element 3.

In the case of the example embodiment, a longitudinal member element 4, which may be arranged, for example, as a conventional ladder-type frame, may be coupled via the self-supporting axle support element 3 to a front element 2 which has a multi-piece frame or a frame with multi-piece longitudinal members 16, 17. This may enable the different constructional principles to be combined with one another.

On each side of the vehicle, the respective front attachment end 9 may be arranged in such a manner that the upper longitudinal member 16 and/or the lower longitudinal member 17 may be fastened at a plurality of points along the front attachment element 9. In this case, the provided attachment points differ from one another with regard to the vertical level which the respectively attached longitudinal member 16, 17 is at relative to the underlying surface or the carriageway after being attached.

In addition or as an alternative, on each side of the vehicle, the rear attachment end 10 may be arranged in such a manner that the profiled longitudinal member 21 may be fastened via its flange part 22 to a plurality of attachment positions along the rear attachment end 10, these attachment points differing from one another with regard to the vertical level which the profiled longitudinal member 22 has relative to the underlying surface after being attached. In this manner, it is possible, when attaching the front element 2 and/or the longitudinal member element 4 to the axle support element 3, to vary the level of the upper side 6 of the front element 2 and/or the level of the upper side 7 of the longitudinal member element 4 in order to adapt the respective supporting structure 1 virtually individually to the independent purpose of the commercial vehicle to be fitted with it.

As illustrated in the side views of FIGS. 3 and 5A to 5C, the front attachment ends 9 (FIGS. 3 and 5A to 5C) and the rear attachment ends 10 (FIG. 3) may have a vertical grid 23 for a screw connection 24. With the aid of this grid 23, it is possible to screw on the respective longitudinal member 16, 17, 21 at different screw-on positions on the respective attachment end 9, 10. The grid 23 may ensure various screw-on positions for the respective longitudinal member 16, 17, 21, which positions differ from one another with regard to the vertical level which the respective longitudinal member 16, 17, 21 is at after being attached to the axle support element 3.

Figure 5A:
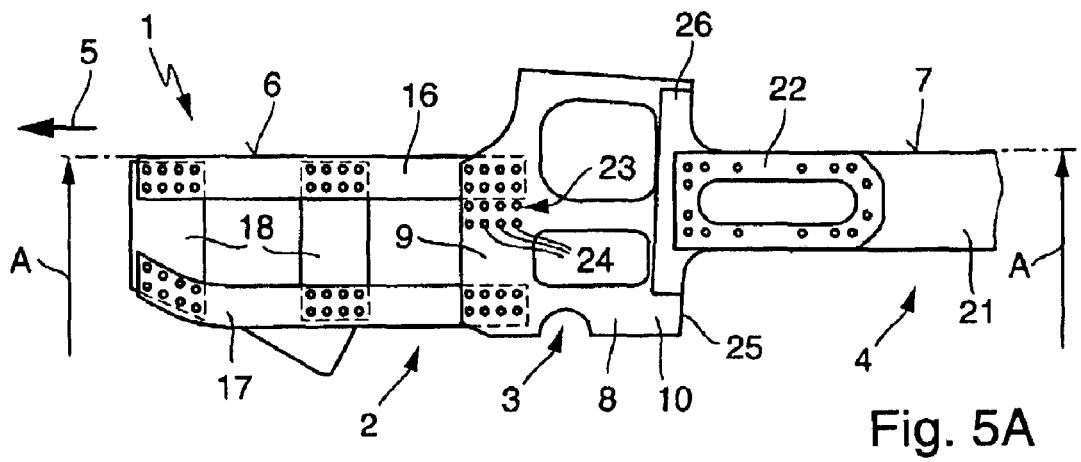
FIGS. 5a to 5c are various side views as in FIG. 3 for different supporting-structure variants of a different embodiment.
Figure 5B:
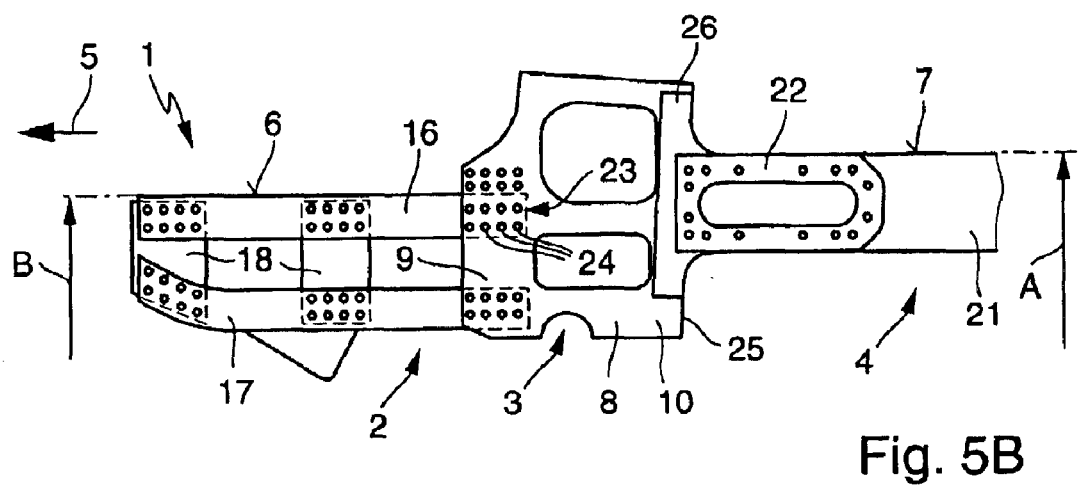
Figure 5C:
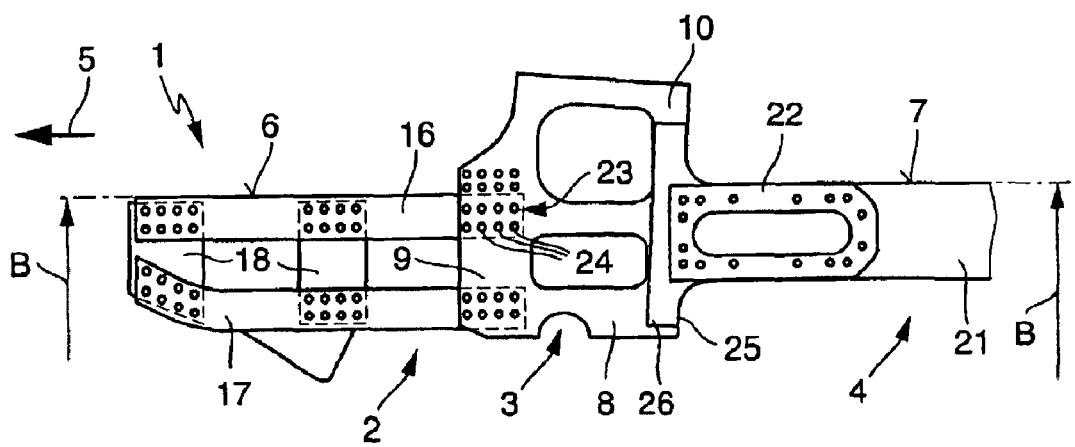

A further variant 4 for realizing the flexible assembly options is explained with reference to FIGS. 5A to 5C. In the case of the example embodiment illustrated in FIGS. 5A to 5C, the rear attachment end 10 in each case is fitted with a vertical end edge 25. In a corresponding manner, the flange part 22 also has a vertical connecting strip 26 which is arranged in such a manner that it may be fastened on the end edge 25 in a simple manner. The end edge 25 and the connecting strip 26 may be shaped in an essentially complementary manner. As illustrated in FIGS. 5A to 5C, the end edge 25 is dimensioned such that it is (e.g., considerably) larger in the vertical direction than the connecting strip 26. At the same time, the arrangement of the end edge 25 is selected in such a manner that the connecting strip 26 may be fastened to the end edge 25 at a plurality of fastening positions along this end edge 25. These fastening positions differ from one another with regard to the vertical level which the respective longitudinal member, here the profiled longitudinal member 21, is at relative to the underlying surface after being attached to the axle support element 3.

Whereas, in the case of the example embodiment illustrated in FIGS. 1 to 4, the flange parts 22 are fastened to the respective axle-support side part 8 via the grid 23 and screw connection 24, the connecting strip 26 in the example embodiment illustrated in FIGS. 5A to 5C may be welded together with the flange part 22 onto the end edge 25.

With the grid 23 and, if appropriate, with the combination of end edge 25 and connecting strip 26, it is possible for different variants to be formed for the supporting structure 1, the variants differing from one another, for example, with regard to the level of the upper side 6 of the front element 2 and/or the upper side 7 of the longitudinal member element 4. In a first assembly variant illustrated in FIG. 5A, the upper longitudinal member 16 of the front element 2 is fastened in an upper position to the axle-support side part 8. This produces, for the upper side 6 of the front element 2, a level which is indicated by A in FIG. 5A. As illustrated in FIG. 5A, the connecting strip 26 is connected to the end edge 25, at the upper end thereof, as a result of which the profiled longitudinal member 21, which is coupled thereto, assumes an upper position in which the upper side 7 of the longitudinal member element 4 is at the upper level A, for example.

In a second assembly variant illustrated in FIG. 5B, the profiled longitudinal member 21 is fitted in such a manner that the upper side 7 of the longitudinal member element 4 is at the level A. In contrast with this, the upper longitudinal member 16 of the front element 2 is fitted, in this variant, in a lower position, resulting in a lower level B for the upper side 6 of the front element 2.

In a third assembly variant illustrated in FIG. 5C, the upper longitudinal member 16 of the front element 2 is fitted in its lower position, so that the upper side 6 of the front element 2 is again at the level B. In this variant, the connecting strip 26 is now fitted to the lower end of the end edge 25, resulting in a lower level for the profiled longitudinal member 21, with the consequence that the upper side 7 of the longitudinal member element 4 is also at the lower level B, for example.

The lower longitudinal member 17 of the front element 2 may also be positioned differently with regard to its level, for example, in order to realize greater slope angles.

Identical components may be used for all three assembly variants of FIGS. 5A to 5C, except for different, vertical webs 18 which differ from one another with regard to their vertical height. The production outlay for producing different supporting-structure variants may thus be comparatively low.

For a particularly inexpensive production of the supporting structure 1 according to the present invention, it is possible to configure the axle-support side parts 8 and/or the lower bridge-type support 11 and/or the upper bridge-type support 15 and/or the flange parts 22 and/or the profiled longitudinal members 21 and/or the upper longitudinal members 16 and/or the lower longitudinal members 17 and/or the vertical webs 18 as sheet-metal shaped parts or as deep-drawn parts or as punched and shaped parts, etc. In order to form variants of the supporting structure 1, the material thickness or the sheet thickness of the sheet-metal shaped parts may be selected as a function of the application and, e.g., as a function of the tonnage provided for the commercial vehicle fitted with the supporting structure. In principle, it may be possible in this case to use essentially the same forming tools for producing the sheet-metal shaped parts, with the result that an extreme simplification in the production of different types of supporting structure may also be possible. For a modular system, with the aid of which the supporting structure 1 may be constructed in different variants, a plurality of types of vertical webs 18 are provided, which types differ from one another with regard to their vertical height, which has already been explained further above with reference to FIGS. 5A to 5C. Moreover, different flange parts 22 may be stored, in order to be able to combine different profiled longitudinal members 21 or different longitudinal member elements 4 with the axle support element 3.

What is claimed is:

1. A supporting structure of a commercial vehicle, comprising:
   an axle support element configured to mount at least a front axle of the vehicle and including, on each side of the vehicle, an axle-support side part having a front attachment end with respect to a direction of travel and a rear attachment end with respect to the direction of travel;
   a front element attached to a front of the axle support element with respect to the direction of travel and configured to support a driver's cab of the vehicle, the front element including at least one first longitudinal member attached to the front attachment end; and
   a longitudinal member element attached to a rear of the axle support element with respect to the direction of travel and configured to support a vehicle body, the longitudinal member element including at least one second longitudinal member attached to the rear attachment end;
   wherein at least one of the front attachment end and the rear attachment end is configured so that at least one of the at least one first longitudinal member and the at least one second longitudinal member is fixable along a respective attachment end at a number of points that differ from one another with regard to a vertical level in accordance with an underlying surface on which the vehicle stands.

2. The supporting structure according to claim 1, wherein the vehicle includes a lorry.

3. The supporting structure according to claim 1, wherein at least one of the front attachment end and the rear attachment end includes a vertical grid arranged for a screw connection, in accordance with which at least one of the at least one first longitudinal member and the at least one second longitudinal member is screwable onto the at least one first attachment end and the rear attachment end, the grid configured to provide a plurality of screw-on positions for the at least one of the at least one first longitudinal member and the at least one second longitudinal member, the positions differ from one another with regard to the vertical level.

4. The supporting structure according to claim 1, wherein at least one of the front attachment end and the rear attachment end includes a vertical end edge, a vertical connecting strip of a flange part fastened to the end edge, the end edge and the connecting strip dimensioned so that a plurality of fastening positions are selectable along the end edge for the connecting strip, the positions differ from one another with regard to the vertical level, at least one of the at least one first longitudinal member and the at least one second longitudinal member fastened to the flange part.

5. The supporting structure according to claim 1, wherein the two axle-support side parts are connected to each other on a lower side that faces the underlying surface via a lower bridge support including a front transverse member that connects the front attachment ends of the axle-support side parts, a rear transverse member that connects the rear attachment ends of the axle-support side parts to each other and a longitudinal member that connects the front transverse member and the rear transverse member to each other and arranged centrally.

6. The supporting structure according to claim 5, wherein the two axle-support side parts are connected to each other on an upper side that faces away from the underlying surface in a region of the rear attachment ends via an upper bridge support so that, in a rear region of the axle support element, the rear attachment ends, the upper bridge support and the rear transverse member of the lower bridge support form a closed ring.

7. The supporting structure according to claim 1, wherein the axle support element and the front element form a unit that is pre-assemblable independently of the longitudinal member element.

8. The supporting structure according to claim 1, wherein the longitudinal member element includes, on each side of the vehicle, a single-part profiled longitudinal member, the front element including, on each side of the vehicle, a multi-part longitudinal member arrangement having an upper longitudinal member configured as an upper flange, a lower longitudinal member configured as a lower flange and a plurality of vertical webs that connect the upper longitudinal members to the lower longitudinal members.

9. The supporting structure according to claim 1, wherein at least one of the axle-support side part of the axle support element, a lower bridge support of the axle support element, an upper bridge support of the axle support element, a flange part, a profiled longitudinal member of the longitudinal member element, an upper longitudinal member of the front element, a lower longitudinal member of the front element and a vertical web of the front element is formed as at least one of a sheet-metal shaped part, a deep-drawn part and a punched and shaped part.

10. The supporting structure according to claim 1, wherein at least the first longitudinal member is fixable along the front attachment end.

11. The supporting structure according to claim 1, wherein the at least one first longitudinal member and the at least one second longitudinal member is fixable along the respective attachment end.

12. A supporting structure of a commercial vehicle, comprising:

an axle support element configured to mount at least a front axle of the vehicle and including, on each side of the vehicle, an axle-support side part having a front attachment end with respect to a direction of travel and a rear attachment end with respect to the direction of travel;

a front element attached to a front of the axle support element with respect to the direction of travel and configured to Support a driver's cab of the vehicle, the front element including at least one first longitudinal member attached to the front attachment end; and a longitudinal member element attached to a rear of the axle support element with respect to the direction of travel and configured to support a vehicle body, the longitudinal member element including at least one second longitudinal member attached to the rear attachment end;

wherein at least one of the front attachment end and the rear attachment end is configured so that at least of the at least one first longitudinal member and the at least one second longitudinal member is fixable along a respective attachment end at a number of points that differ from one another with regard to a vertical level in accordance with an underlying surface on which the vehicle stands; and wherein the front element includes, on each side of the vehicle, two longitudinal members spaced apart from each other in the vertical direction and connected to each other via vertical webs, the front element including, at a front end, an under-ride protector that adjoins lower first longitudinal members in the direction of travel and a transverse member that adjoins upper first longitudinal members in the direction of travel.

13. A modular system for construction of a supporting structure, comprising:

an axle support element configured to mount at least a front axle of a vehicle and including, on each side of the vehicle, an axle-support side part having a front attachment end with respect to a direction of travel and a rear attachment end with respect to the direction of travel;

a front element attached to a front of the axle support element with respect to the direction of travel and configured to support a driver's cab of the vehicle, the front element including at least one first longitudinal member attached to the front attachment end;

a longitudinal member element attached to a rear of the axle support element with respect to the direction of travel and configured to support a vehicle body, the longitudinal member element including at least one second longitudinal member attached to the rear attachment end, at least one of the front attachment end and the rear attachment end configured so that at least one of the at least one first longitudinal member and at least one second longitudinal member is fixable along a respective attachment end at a number of points that differ from one another with regard to a vertical level in accordance with an underlying surface on which the vehicle stands; and a plurality of types of vertical webs that differ from one another with regard to vertical height.

14. The modular system according to claim 13, wherein the modular system includes a plurality of types of at least one of the axle-support side parts, lower bridge supports, upper bridge supports, flange parts, profiled longitudinal members, upper longitudinal members, lower longitudinal members and vertical webs, the types differing with regard to one of material thickness and sheet thickness.

* * * * *

UNITED STATES PATENT AND TRADEMARK OFFICE
CERTIFICATE OF CORRECTION

PATENT NO. : 6,871,875 B2
DATED : March 29, 2005
INVENTOR(S) : Grimm et al.

It is certified that error appears in the above-identified patent and that said Letters Patent is hereby corrected as shown below:

Column 9,
Line 44, change "configured to Support" to -- configured to support --; and Column 10,
Line 2, change "at least of the" to -- at least one of the --.

Signed and Sealed this

Third Day of January, 2006

JON W. DUDAS
*Director of the United States Patent and Trademark Office*